Feb. 11, 1958     R. C. SUTTER     2,822,889
CHLORINE PURIFICATION
Filed Sept. 26, 1955
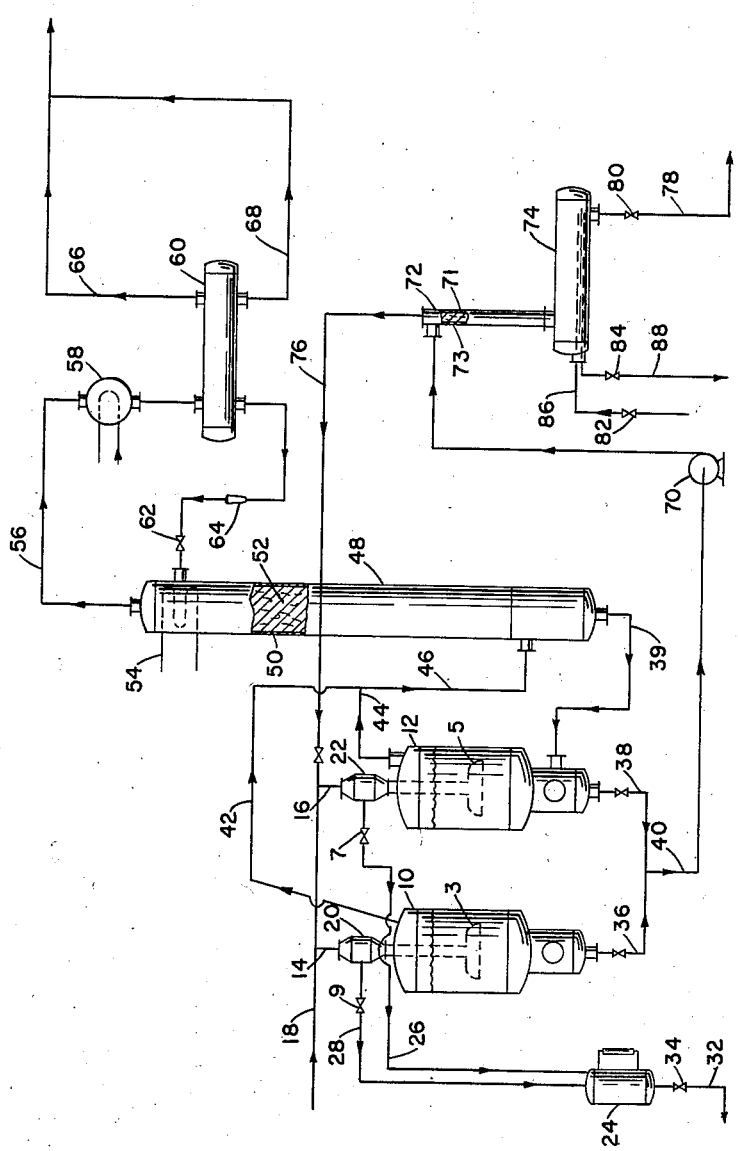
INVENTOR
ROBERT C. SUTTER
BY    C. T. Cross
ATTORNEY

United States Patent Office 2,822,889
Patented Feb. 11, 1958

2,822,889

CHLORINE PURIFICATION

Robert C. Sutter, Painesville, Ohio, assignor to Diamond Alkali Company, Cleveland, Ohio, a corporation of Delaware Application September 26, 1955, Serial No. 536,472

4 Claims. (Cl. 183—120)

This invention relates to the treatment of chlorine gas to remove organic and other impurities therefrom, and more particularly to a method and apparatus for removing impurities from gaseous chlorine by extraction with liquid chlorine with continuous separation of the impurities from the liquid chlorine.

At present, most chlorine gas is produced commercially by electrolyzing an aqueous brine solution. This process produces a chlorine gas containing a significant proportion of water vapor, air and carbon dioxide, in addition to a small amount, generally of the order of about 1% by weight, of various organic materials, of which chloroform, carbon tetrachloride and hexachloroethane are the most frequently encountered. In most, if not substantially all applications, it is desirable to purify the chlorine gas by removing these or other contained organic impurities.

The prior art

The water vapor can be removed from the gas by cooling and the well-known concentrated sulfuric acid treatment. However, this procedure is not effective to remove the other contained gases and organic impurities. In fact, the sulfuric acid treatment produces, by reaction with the impurities, a series of complex sulfonated and other sulfur-containing compounds, the removal of which also is essential to obtain an ultimate chlorine gas of satisfactory commercial purity.

For ease of storage and transportation, commercial chlorine is generally handled in liquid form and unless the chlorine is subjected, prior to condensation, to treatment effective to reduce the concentration of the impurities to a practicable low level, trouble will be encountered in the condensing equipment, especially from fouling of condenser surfaces by deposition thereon of solid impurities, as well as by plugging the valves and other instrumentalities for controlling movement of the liquid material.

The transportation of chlorine is simplified somewhat by advance removal of these impurities. Pressurized portable steel containers generally are employed for the transportation of the gas which is obtained by vaporization of the liquid chlorine withdrawn from the pressurized container. To insure uniform purity of the gas, and to avoid possible clogging of the container valves, it is essential that the chlorine be free from impurities prior to liquefaction. Hence, unreasonable maintenance expense is best avoided by treatment of the gaseous chlorine prior to its condensation.

Heretofore, it has been proposed that the impurities in the chlorine can be removed by passing the chlorine gas from electrolytic cells upwardly through a countercurrent scrubbing tower provided with heating means at the bottom of the tower and with a refrigerating coil effective to condense a portion of the chlorine gas to liquid chlorine. Generally, the refrigerating coil is placed in an upper portion of the scrubbing tower and chlorine liquefied in the region of the coil descends countercurrently through the ascending chlorine gas and serves as a scrubbing medium.

However, the foregoing prior art method has several disadvantages. For example, the temperature of the chlorine gas necessarily is raised well above that essential for vaporization and ultimately there is involved a wasted expense of heating the gas since in any event the gas ultimately must be liquefied. Moreover, efficient operation of the scrubbing tower is sensitive to variations in the amount of chlorine liquefied. Since all of the liquid chlorine is obtained by liquefaction of gaseous chlorine passing therethrough, and since the amount of chlorine liquefied fluctuates with variations in the rate of chlorine gas flow and with the temperature of the chlorine gas, at times an insufficient amount of chlorine may be liquefied to remove all of the impurities when used as a descending scrubbing medium. Contrariwise, at other times the scrubbing tower may be flooded with descending liquid chlorine.

Perhaps the most efficient and practicable solution to the problem up to this time is that described in Sutter U. S. Patent 2,700,431 which avoids the foregoing problems by first conducting the chlorine gas, containing organic and other impurities, through a batch of liquid chlorine, and then passing the treated gas through a scrubbing tower through which descends liquid chlorine as a scrubbing medium. By such practice, the impurities contained in the chlorine are initially extracted in the liquid chlorine bath which may be regarded, if desired, as one plate of a multi-plate scrubbing tower and which serves the important function of extracting the bulk of the impurities. Moreover, the temperature and pressure of the chlorine flowing into the tower can readily be controlled within a narrow range. By this expedient, the subsequent flow of the chlorine gas countercurrently to the flow of liquid chlorine is rendered more efficient, for the temperature of the chlorine gas can be kept low enough, even approximating its boiling point, without evaporating any appreciable quantity of liquid chlorine in passing through the scrubbing tower. Assurance is thus available that the remainder of the impurities are removed in the tower treatment. Moreover, the amount of chlorine condensed in the refrigerated portion of the tower can be kept within very narrow limits.

While the foregoing process does represent a marked advance in the chlorine purification art, the present invention comprises an improvement thereon which renders it even more advantageous in operation.

A principal object of this invention is to provide a new and improved method of treating liquid chlorine containing substantial amounts of organic impurities.

A further object of the invention is to provide a new and improved method of purifying chlorine in a continuous manner which avoids any detrimental effects attributable to cyclic operation.

A still further object of the invention is the provision of a new and improved system of separating and removing impurities from gaseous chlorine in a manner which avoids any significant loss of chlorine with the discharge of the separated impurities.

These and other objects and advantages of the invention will be more fully understood from the following description.

The apparatus of this invention

In the accompanying drawing is shown a schematic flow diagram which omits some valves and flow meters for clarity, and illustrates the preferred practice of the invention. From the drawing it will be seen that a continuous purification process can be carried out by first supplying liquid chlorine to a container and then passing gaseous chlorine into the liquid chlorine in a superheated condition whereby it is scrubbed by the liquid chlorine, releases its heat, and evaporates some of the liquid chlorine, maintaining the proper level of liquid chlorine in the container, and continuously removing portions of the liquid chlorine therefrom to provide a minimum concentration therein of organic impurities, hereinafter frequently referred to as "heavy ends."

The gaseous chlorine emerging from the liquid chlorine then is passed continuously into a stripping tower or column in which there is supplied at or near the top of the tower, the amount of liquid chlorine required for countercurrent extraction of the ascending gaseous chlorine, e. g., by maintaining a refrigerating coil at the proper temperature, or by returning a sufficient quantity of liquefied chlorine from suitable condensing means outside the chamber, and recovering purified gaseous chlorine from the top of the tower while liquid chlorine continuously is removed from the bottom of the tower and sent to the liquid chlorine containers where impurities are continuously removed therefrom in a manner hereinafter described in more detail.

The present invention relates primarily to the treatment of the liquid chlorine used as an initial extraction medium in the purification of gaseous chlorine. It has been customary in prior practice to employ two or more containers of liquid chlorine and alternately to purge first one and then the other, thereby to remove the accumulated organic impurities or heavy ends which tend to build up to an undesirable concentration in the liquid chlorine. In many respects such practice was satisfactory. However, it has been found that certain difficulties often are involved because such operation closely approximates that of a cyclic process wherein the heavy ends or organic impurity concentration in the liquid chlorine at one moment is quite high, and at the next instant is practically zero. Hence, it will be realized that an undesired fluctuation in the composition of the extractant and, thus, in its properties heretofore necessarily has been inherent in the operation of the process. By the practice of this invention, this cyclic removal of organic impurities from the liquid chlorine is entirely avoided. The present invention accomplishes the foregoing desired results generally by continuously removing a portion of the liquid chlorine extraction media and subjecting this portion to a distillation operation wherein chlorine gas is separated and returned to the gaseous chlorine feed line, while the organic impurities or heavy ends are separated and may either be discharged to the sewer or further treated to recover therefrom such materials as chloroform, carbon tetrachloride and the like.

In the drawing, two liquid chlorine containers are shown at 10 and 12. These containers are provided with inlet pipes 14 and 16, respectively, which in turn are connected to a chlorine gas feed line 18. The pipes 14 and 16 lead into line separators 20 and 22, respectively, and then into the liquid chlorine containers. The line separators 20 and 22 are so-called "mist extractors" adapted to remove substantially all liquid entrainment, especially sulfuric acid retained from prior drying operations. From these separators 20 and 22 the separated liquids are sent to a receiver 24, via lines 26, 28 and valves 7 and 9. The contents of the receiver 24 may be discharged periodically through line 32 by means of valve 34.

The gaseous chlorine being introduced into the liquid chlorine at a point beneath the level of the liquid chlorine, e. g., via the nozzles 3 and 5 indicated by the broken lines.

At the bottom of the containers 10 and 12 are pipes 36 and 38 which combine in a common line 40 for continuously removing, from one or both containers 10 and 12, liquid chlorine containing heavy ends or organic impurities as will be described more fully hereinafter.

In practice, suitable vent means (not shown) are usually provided on top of each chlorine container 10 and 12 but are usually maintained closed to the atmosphere. The containers 10 and 12 may suitably be provided with convenient means of heating and are preferably well insulated. An example of a convenient means of providing for heating the containers is to provide the same with a liquid temperature regulating system through which hot or cold water can be circulated, suitable valving being included to permit temperature regulation of either container independently of the other. From the containers 10 and 12 extend chlorine gas lines 42 and 44 which combine to form a feed line 46 for the column 48. In the column 48 which suitably may comprise an elongated cylinder 50 filled with conventional packing 52, e. g., Berl saddles, rings or other inert packing material. The purified chlorine gas which has passed upwardly through descending liquid chlorine passes through line 56 to an overhead condenser 58 and thence to a reflux accumulation tank 60. The reflux of liquid chlorine to the tower 48 may be regulated by appropriate valve means indicated generally at 62 with the aid of a flow indicator 64. Alternatively, the upper portion of the column 48 may be provided with refrigeration means, such as the refrigeration coil 54 suitably connected with refrigeration providing means (not shown). From the reflux accumulation tank 60 there is discharged a purified chlorine gas via pipe 66. To this may be added, if desired, excess liquid chlorine via line 68 which then is combined with the purified gaseous chlorine from line 66.

This invention deals primarily with the treatment of the liquid chlorine employed in containers 10 and 12. More particularly, the practice of the present invention contemplates continuously removing, via lines 36, 38, and 40 from one or both of the containers 10 and 12, contaminated liquid chlorine and subjecting this contaminated liquid chlorine to a distillation operation whereby the chlorine gas is separated and returned to the containers 10 and/or 12 to be admixed with the chlorine gas feed, and the organic contaminants are separated and either discharged or subjected to further treatment to separate and recover valuable constituents thereof.

In referring to the drawing, the preceding operation may be traced by following the line 40 from the liquid chlorine containers. By means of a pump 70 the continuous discharge from the liquid chlorine containers is passed to the top of a stripper column 72 typically comprising a cylinder 71 packed with inert packing 73. In the column 72 which is operatively connected to a stripper reboiler 74, the chlorine gas is separated from the contaminated liquid chlorine feed and returned as gaseous chlorine feed via line 76. The organic impurities originally contained in the liquid chlorine remain in the stripper reboiler 74. When a sufficient quantity has accumulated, discharge line 78 is opened via valve 80 and the liquid residue either is treated to separate such materials as chloroform or carbon tetrachloride therefrom, or is discharged to the sewer. If desired, of course, the heavy ends from the stripper can be continuously discharged via line 78. Heat for the stripper reboiler can conveniently be supplied by steam suitably regulated by valves 82 and 84 from any convenient source (not shown) through line 86, line 88 serving as a steam condensate discharge means.

From the description of the invention thus far, it will now be appreciated that this invention provides a significant improvement over the already advantageous practice of the Sutter invention described and claimed in U. S. Patent 2,700,431. By the present practice, liquid chlorine which serves as an initial extractant for organic impurities in gaseous chlorine, is continuously treated to maintain a low and substantially constant content of organic impurities, and maintains its excellent properties. This procedure is in marked contrast to the Sutter invention wherein the liquid chlorine is discharged periodically.

While two liquid chlorine containers preferably are operated in parallel and are shown in the drawings, it will be apparent, of course, that this invention also contemplates that but one liquid chlorine container of adequate size also may be utilized since the very novel features of this invention eliminate the necessity of providing a plurality of liquid chlorine containers so that periodic purging of one may be accompanied without taking the purification unit off stream.

In order to start the system in operation it will, of course, be necessary to furnish a minimum amount of liquid chlorine to the containers 10 and 12. Thereafter, liquid chlorine may be supplied from the tower 48. In any case, make-up of liquid chlorine in the containers 10 and 12 is essential to replace that evaporated by the superheated entering chlorine gas. In a preferred example with a column approximately 16 inches in diameter and packed with 20 feet of Berl saddles one inch size, and with 200 gallon capacity liquid chlorine containers, chlorine gas is admitted into the liquid chlorine containers at a pressure of 35 to 40 p. s. i. g. and at a temperature of 120° to 125° F. at a rate of 180 cubic feet per minute. The temperature of the liquid chlorine in the containers 10 and 12 is such that the gas which emerges at about the same rate and pressure has a temperature of 28° F. This gas enters the column 48 and emerges at the upper end thereof at the rate of 172.9 cubic feet per minute at 28° F. Approximately 17% of the gas is condensed in the condenser and returned to the column, while the remainder leaves the system, emerging at a rate of 144.5 cubic feet per minute in a temperature of 28° F. Under these conditions, in a period of 24 hours, about 70 tons of chlorine are purified in the described apparatus, the purified product containing 99.999% by weight chlorine.

During the operation of the process, liquid chlorine from containers 10 and 12 is continuously fed to the stripper column 72, the stripper bottoms being a chlorine-saturated mixture of chlorinated hydrocarbons and sulfuric acid of approximately the following composition wherein the numerals express percentages by weight:

| | |
|---|---|
| Chlorine | 3.0 |
| Chloroform | 47.0 |
| Carbon tetrachloride | 14.0 |
| Trichloroacetylchloride | 12.0 |
| Pentachloroethane | 5.0 |
| Hexachloroethane | 18.0 |
| Residue | 1.0 |

Under the same conditions, the line separators 20 and 22 remove about 8 to 11 pounds of 85-94% sulfuric acid per 100 tons of chlorine gas.

The stripper column 72, when employed in a process involving a large daily tonnage, typically is 12 inches in diameter and about 11 feet high containing a 10 foot section of one inch Berl saddles packing. The stripper reboiler 74 typically comprises a horizontal tank 3 feet in diameter and approximately 12 feet long with internal heat exchanger supplied with relatively low pressure steam to furnish the necessary heat.

It will be evident to those skilled in the art that considerable modification is possible in the temperatures and pressures employed and in the amount of chlorine liquefied by changing the dimensions, configurations, and capacities of the system, but all of these modifications come within the scope of the invention.

Other modifications will be evident to those skilled in the art, and it will be understood that all modifications coming within the scope of the following claims but not specifically described herein are within the scope of the invention.

What is claimed is:

1. In a process for purifying chlorine having organic impurities associated therewith, the improvement which includes introducing superheated gaseous chlorine into a body of liquid chlorine beneath the surface thereof, thereby to cool said superheated gaseous chlorine, condense organic impurities associated with said gaseous chlorine, and vaporize chlorine from said body, passing the vaporized chlorine from said body in countercurrent contact with a stream of liquid chlorine, removing a portion of said body of liquid chlorine containing dissolved organic impurities simultaneously with the introduction thereinto of gaseous chlorine containing organic impurities, and recovering purified chlorine from said gaseous stream passing in countercurrent contact with said stream of liquid chlorine.

2. The process of claim 1 which includes heating said portion of liquid chlorine removed from said body, thereby to vaporize chlorine therefrom, and combining the thus-vaporized chlorine with said superheated gaseous chlorine prior to introducing the latter into said body of liquid chlorine.

3. The process of claim 1 which includes conducting the stream of liquid chlorine after countercurrent-contact with said vaporized chlorine, to said body of liquid chlorine.

4. The process of claim 3 wherein the removal of said portion of said body of liquid chlorine containing dissolved organic impurities, and the conducting of said stream of liquid chlorine to said body are at such rates as to maintain the volume of said body of liquid substantially constant.

References Cited in the file of this patent
UNITED STATES PATENTS

| | | |
|---|---|---|
| 2,540,905 | Neubauer et al. | Feb. 6, 1931 |
| 2,700,431 | Sutter | Jan. 25, 1955 |

FOREIGN PATENTS

| | | |
|---|---|---|
| 866,780 | France | June 9, 1941 |

OTHER REFERENCES

"A Distillation Method for the Separation of Impurities in Commercial Chlorine" by F. W. Matthews and G. G. Warren (Canadian Inds.; Ltd.; McMasterville, Quebec), Can. J. Technol. 32, 193–8 (1954).